United States Patent [19]

Winegeart

[11] Patent Number: 4,650,153
[45] Date of Patent: Mar. 17, 1987

[54] OIL WELL SAFETY VALVE FOR USE WITH DRILL PIPE

[76] Inventor: Mitchel E. Winegeart, 4512 Hessmer Ave., Metairie, La. 70002

[21] Appl. No.: 738,062

[22] Filed: May 24, 1985

Related U.S. Application Data

[63] Continuation-in-part of Ser. No. 561,647, May 28, 1985, Pat. No. 4,519,576.

[51] Int. Cl.⁴ .............................................. F16K 31/16
[52] U.S. Cl. ....................................... 251/58; 175/218
[58] Field of Search .................... 251/58, 62; 166/319, 166/332; 175/218; 277/31; 166/84

[56] References Cited

U.S. PATENT DOCUMENTS

| | | | |
|---|---|---|---|
| 3,806,082 | 4/1974 | Kellner | 251/58 |
| 3,887,161 | 6/1975 | Kubelka, Jr. | 251/58 |
| 3,941,348 | 3/1976 | Mott | 251/58 |
| 4,422,618 | 12/1983 | Lawson | 251/58 |

Primary Examiner—James C. Yeung
Assistant Examiner—Allen J. Flanigan
Attorney, Agent, or Firm—Pravel, Gambrell, Hewitt & Kimball

[57] ABSTRACT

A safety valve and operator for a rotatable kelly or drill string. The valve includes a ball valve, a fluid operator, a swivel connection permitting rotation of the ball valve relative to the operator, and a mechanical movement for converting linear motion of the fluid operator to a pivoting motion for closing or opening the ball valve. A preferred form of the invention includes a rack-and-pinion device associated with the ball valve, a pair of bearing assemblies rotatably supporting the ball valve and rack-and-pinion assembly, and an annular hydraulic actuator connected to a housing which carries the bearing assemblies, the ball valve, and the rack-and-pinion assembly.

9 Claims, 11 Drawing Figures

OIL WELL SAFETY VALVE FOR USE WITH DRILL PIPE

REFERENCE TO RELATED APPLICATION

This is a continuation in part of U.S. Ser. No. 561,647 entitled "Oil Well Safety Valve for Use with Drill Pipe," which issues on May 28, 1985, as U.S. Pat. No. 4,519,576.

BACKGROUND OF THE INVENTION

The present invention relates to oil and gas well drilling and safety valves used in oil and gas well drilling. More particularly, the present invention relates to an improved kelly valve actuator assembly which allows the kelly valve to be opened or closed when the kelly is spinning or still from a remote location.

In the oil and gas well drilling industry, a powered rotary table rotates a kelly and a kelly bushing to rotate the drill string at the rig floor. There is commonly employed a valve to close the drill string bore at the rig floor. Such valves are commercially available devices. Some models have patented features. For example, a recent patent is U.S. Pat. No. 4,293,163 which shows certain improvements in the valve stem and seals associated with the valve. Kelly valves are usually manually operated. A socket associated with the valve stem is receptive of a wrench or other such torque imparting tool. Oil rig workers simply rotate a wrench to close or open the valve. By controlling the flow of fluid through the drill string, the kelly valve can be used to prevent in-line blowouts. A problem exists in that rig workers cannot always reach the kelly valve. Sometimes the valve is too high above the rig floor to reach. At other times the kelly valve might be disconnected from the drill string such as during a trip where pipe is being removed from the well (for example, to replace the drill bit).

There have been some attempts to automatically open and close the kelly valve from a remote location. One such device can be seen in U.S. Pat. No. 3,887,161. In the U.S. Pat. No. 3,887,161, a plurality of hydraulic cylinders are supported by a plate that attaches to the hydraulic swivel portion of the drilling apparatus. The hydraulic cylinders are all connected to a single annular plate which surrounds the kelly valve. An arc-shaped cam is connected to the valve stem. Expansion and contraction of the hydraulic cylinders cause an annular plate to engage the cam and push on the cam thereby rotating the valve stem to close the valve. The apparatus normally is used when the kelly is not spinning, and in fact is retracted during spinning of the kelly to a withdrawn position.

Another remotely operable kelly valve actuator can be seen in U.S. Pat. No. 3,941,348 issued to Mott entitled "Safety Valve." That device provides a remotely operable safety valve mounted between the swivel and the kelly in drilling operation including a spherically shaped valve element which is mounted in a tubular housing rotatable with a swivel sub, the kelly and the drill string. Hydraulic cylinders move the valve element between open and close positions in order to control flow through the drill string and prevent in-line blowouts. As an additional safety feature, a spring moves the valve element to a closed position in the event of a failure of the hydraulic means. The Mott patent uses an annular channel which is connected to a rack. The rack engages pinion gears which are associated with the valve stem. Hydraulic cylinders use an annular ring which supports a plurality of space roller bearings that engage the channel. When the hydraulic cylinders expand, the bearings connected to the ring which is moved by the cylinders engages the channel which forces the racks to move so that the pinion gears are rotated. The Mott patent uses a complex linkage which is maintenance prone and which relies upon a large sequence of extraneous linkage members to insure proper operation.

A fluid collector ring forms an interface between spinning and non-spinning portions of a housing in U.S. Pat. No. 4,519,576 to Mitchel E. Winegeart (applicant herein), entitled "Oil Well Safety Valve For Use With Drill Pipe." In that patent, a drill string safety valve operator provides a rotatable tubular body having a longitudinal through bore for conveying fluids. A valve member is movably disposed within the body for valving the fluid flow through the bore. A crank arm extends from and is coupled to the valve member at the valve stem for moving the valve member between open flow and closed flow positions responsive to rotation of the crank arm. A bearing is carried at the outboard end of the crank arm for transmitting load to the crank arm. An annular ring is supported about the tubular housing and provides a surface that can engage the bearing. Hydraulic cylinders power the annular ring so that the annular ring engages the bearing. Downward movement of the ring causes a corresponding downward movement of the bearing and a corresponding rotation of the crank arm. The apparatus thus allows quick remote closure of the valve during a blowout condition of the drill pipe bore.

SUMMARY OF THE INVENTION

The present invention provides a kelly operator which includes a rotatable tubular housing having a longitudinal through bore for conveying fluids. A valve member movably disposed within the housing valves fluid flow through the bore. In the preferred embodiment, the rotatable tubular housing and the valve member can, in fact, be the body and valve element of a conventional kelly valve. A crank arm extends from and is coupled to the valve member. The crank arm angularly connects with the valve member and extends outwardly therefrom. The crank arm is rotated during operation so as to close and open the bore. A bearing is carried by the crank arm outer end for transmitting load to the crank arm. An annular ring is supported about the tubular housing and has at least a surface which can engage the bearing for quickly moving the crank arm to a closed position by transmitting load to the bearing. A plurality of powered hydraulic cylinders at least partially support the annular ring in a position about the housing and move the annular ring linearly with respect to the housing between upper and lower positions. Movement of the hydraulic cylinders can thus effect a quick closing during a blowout condition of the bore. The crank arm includes a drive shaft member which is connectable to the valve member and a crank arm connected at one end to the drive shaft and extending therefrom. The drive shaft axis and the arm axis form an angle so that the bearing portion of the crank arm aligns with the annular ring. In the preferred embodiment, the angle between the drive shaft axis and the arm axis form an obtuse angle. In the preferred embodiment, the tubular valve body provides box and pin end connectors for attaching the tubular valve body to the top of the drill string, or to the kelly or to the hydraulic swivel, as desired. A housing is supported with respect to the valve body by supports. The crank arm extends from the valve member and rotates with the valve member while the housing carries the hydraulic pistons and the annular ring with the channel. Thus, the valve body, a valve member, and crank arm can rotate while the housing, hydraulic cylinders, and annular ring with channel do not. Since the annular ring provides a load transfer surface which is annular (being radially projected about the body), no matter what position the crank arm and valving member assume, the annular ring will always be able to abut the crank arm and effect a closure by transferring load thereto. Thus in a flow out condition, remote closure of the bore is possible to prevent a blowout condition.

In an alternate embodiment, the hydraulic cylinder incloudes a single annular cylinder which carries an elongated linear rack. A pinion gear mounted on the shaft rotates responsive to movement of the rack upwardly and downwardly (FIGS. 10-11).

BRIEF DESCRIPTION OF THE DRAWINGS

A better understanding of the invention can be had when the detailed description of a preferred embodiment set forth below is considered in conjunction with the drawings, in which.

DETAILED DESCRIPTION OF THE PREFERRED EMBODIMENT

Figure 1:
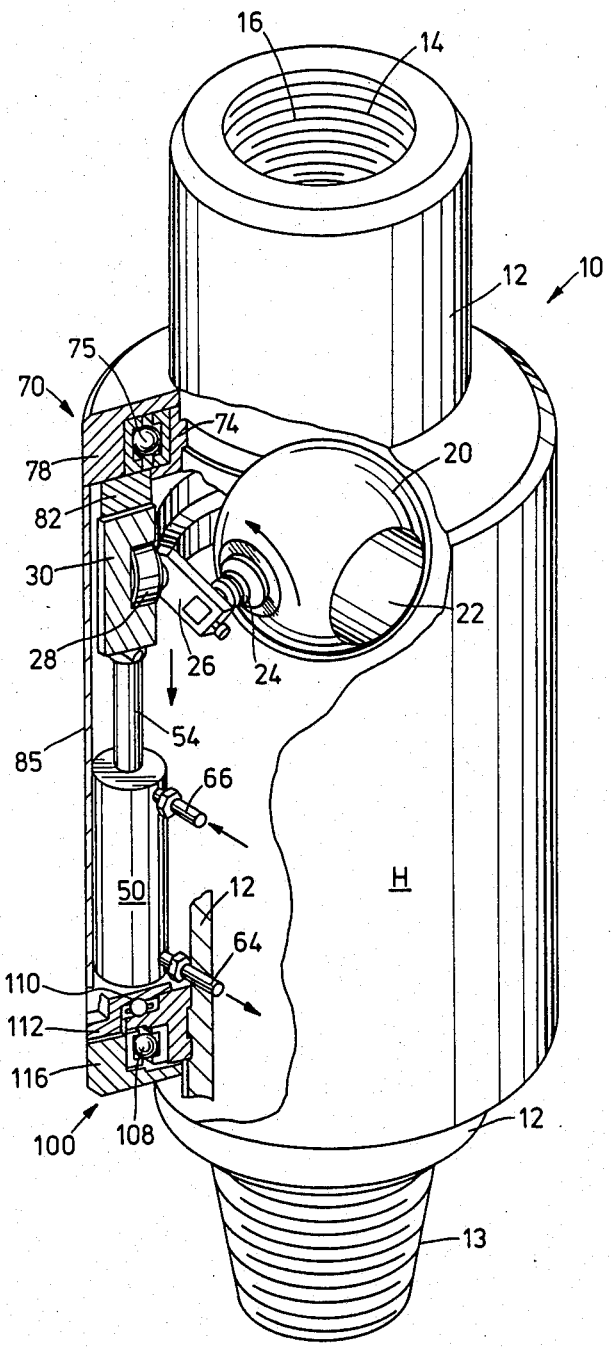
FIG. 1 is a perspective fragmentary view of one embodiment of the apparatus of the present invention.
Figure 2:
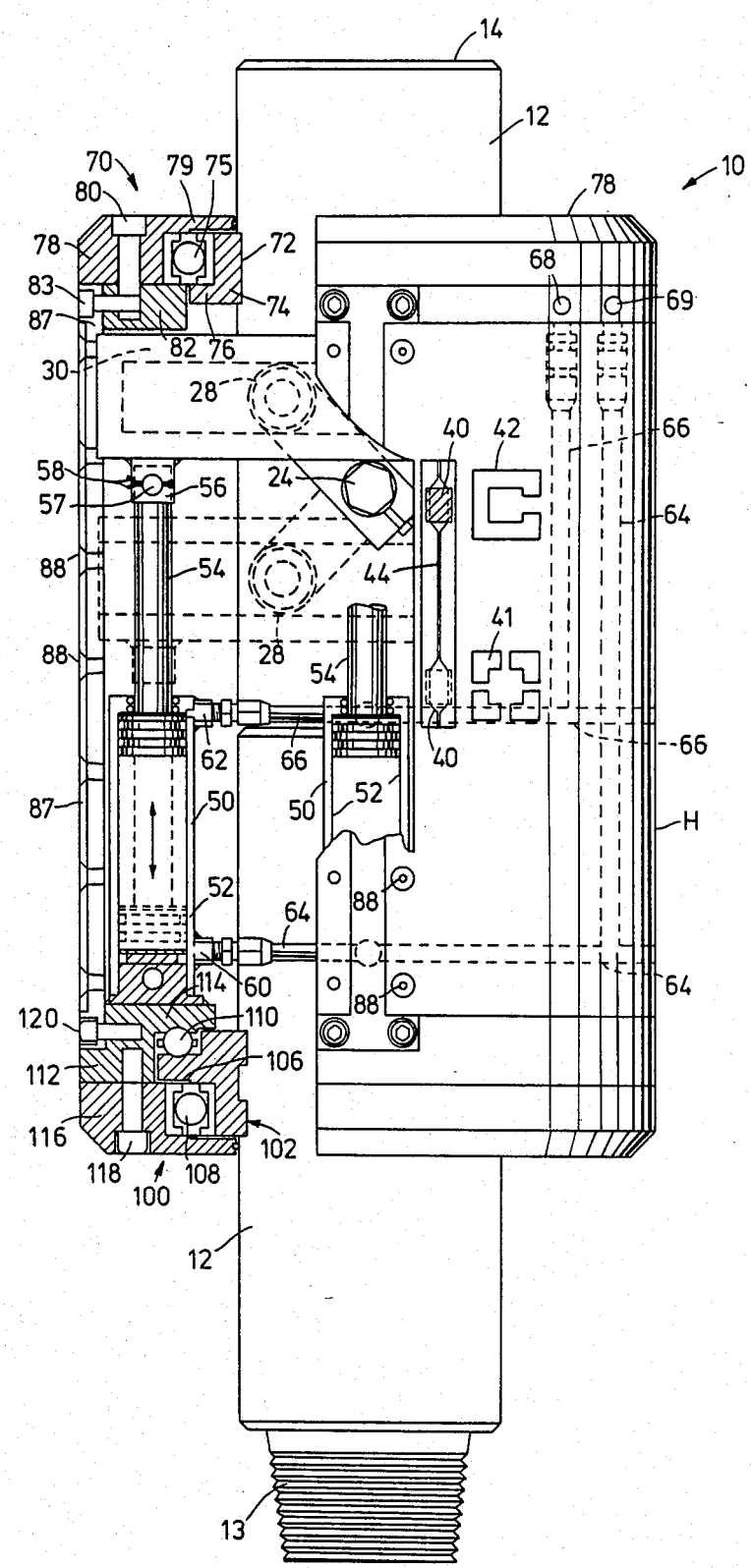
FIG. 2 is an elevational view of one embodiment of the apparatus of the present invention.

FIGS. 1 and 2 best illustrate the preferred embodiment of the apparatus of the present invention designated generally by the numeral 10. Kelly valve actuator 10 provides a valve body 12 having a pin end 13 and a boxed end 14. A longitudinal through bore 16 allows fluid to flow through body 12. A generally spherical valve member 20 is disposed and supported within body 12 and rotates between open and closed flow positions so as to be able to valve bore 16. Valve member 20 likewise provides a longitudinal bore 22 which aligns with bore 16 during the open flow condition. Shaft 24 connected to a valve member can be rotated from the exterior of valve body 12.

A crank arm 26 connects with shaft 24 of valve member 20. Crank arm 26 as will be described more fully hereinafter is moved in a rotational direction so that it opens and closes the bore 16 of valve body 12. The outboard end portion of crank arm 26 provides a bearing 28 which can rotate. Load is transferred to crank arm 26 through bearing 28 by means of annular ring 30.

Figure 3:
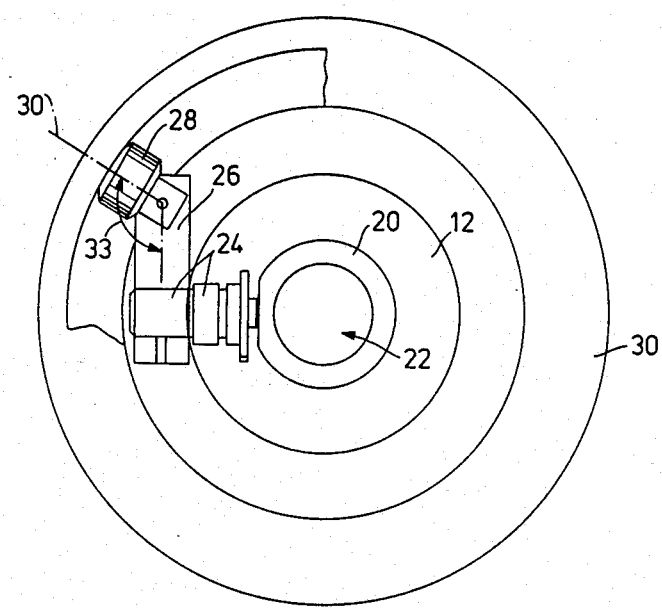
FIG. 3 is a horizontal sectional view of the first embodiment of the apparatus of the present invention.
Figure 4:
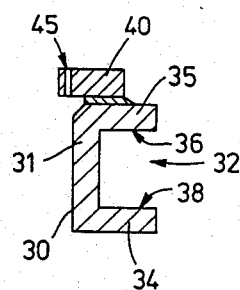
FIG. 4 is a fragmentary sectional view of the annular ring of the first embodiment of the apparatus of the present invention.
Figure 5:
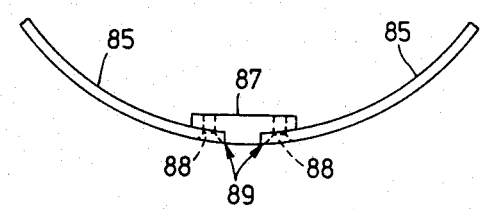
FIG. 5 is a horizontal sectional fragmentary view of the housing cover portion of the first embodiment of the apparatus of the present invention.

Annular ring 30 is generally C-shaped in section (see FIG. 4). Ring 30 provides a recess 32 which is defined by web 31, lower flange 34 and upper flange 35. Each flange 34, 35 provides a surface 36, 38 which can transfer load to bearing 28 of crank arm 26. In FIG. 3, curved arrow 33 indicates the angle between the axis of crank arm 26 and the axis of bearing 28. This angle 33 is preferably an obtuse angle, i.e. greater than 90°. Recess 32 faces inwardly so that bearing 28 communicates with and occupies recess 32. The outer curve surface of bearing 28 thus can abut either surface 36 of flange 35 or surface 38 of flange 34 depending on whether the valve is being opened or closed. In FIGS. 2 and 4, 40 designates a manual lift-eye having an opening therethrough which can be engaged by a chain, shackle, or the like. Thus, if hydraulic power is lost, valve member 20 can be manually opened or closed by lifting or pulling down upon lift-eye 40. In FIG. 2, there can be seen schematic illustrations in the form of O 41 and C 42 illustrating clearly to an operator the closed and open positions of valve member 20 and thus bore 16. An elongated slot 44 allows lift-eye 40 to move freely between the open and closed positions. A lift-eye opening 45 in lift-eye 40 allows a chain, hook, or the like to be attached thereto.

A plurality of hydraulic cylinders 50 are mounted upon housing H. The hydraulic cylinders 50 expand and contract when they are supplied with or emptied of hydraulic fluid. Each hydraulic cylinder provides a cylinder body 52 and push rod 50, the push rod being a movable portion of the entire assembly. A plurality of brackets 56 attach each push rod 54 to annular ring 30. Brackets 56 can be welded for example to ring 30 or other such means. An elongated pin 57 secured in place by cotter pin 58 holds the end portion of each push rod 54 to its particular bracket 56.

In FIG. 1, there can be seen a pair of hydraulic ports 60, 62 for supplying and withdrawing hydraulic fluid from cylinder 52. Hydraulic fluid supply line 64, 66 communicate respectively with ports 60, 62. Hydraulic connections 68, 69 allow hydraulic lines to be connected to the entire apparatus 10 for supplying a source of pressurized hydraulic fluid thereto.

Figure 6:
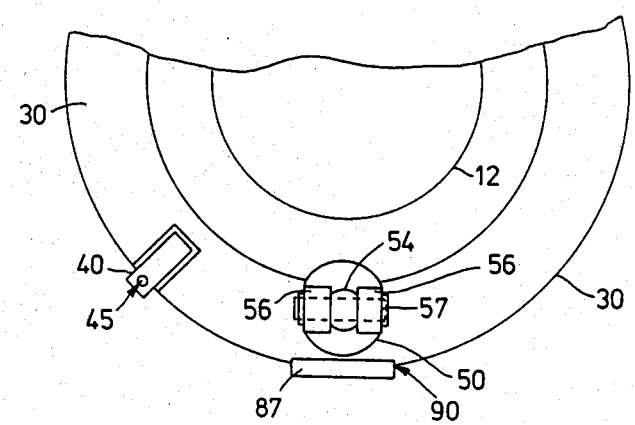
FIG. 6 is another horizontal sectional view of the first embodiment of the apparatus of the present invention illustrating the valve member, the valve body, the housing, the hydraulic cylinders, and the annular ring.

An upper bearing assembly 70 includes annular split ring bearing support 74 which is mounted upon body 12 at annular groove 72. A laterally extending annular flange 76 extends from split ring bearing support 74 so that bearing 75 rests thereupon once assembled. Annular housing support 78 attaches by means of a plurality of bolts 80 to upper housing support ring 82. A plurality of bolts 83 attach housing ribs 87 to upper housing support ring 82. Recesses 89 allow individual quarter section of housing cover 85 to form a continuous cylindrical outer shell. Assembly screws 88 complete the assembly. Ring 30 is grooved so that each of the four ribs 87 acts as a guide for ring 30. In FIG. 6, groove 90 in ring 30 corresponds to and is occupied by rib 87.

Similarly, a lower bearing assembly 100 provides an annular split ring 104 which attaches to housing 12 at a provided annular groove 102 formed in body 12. A laterally extending flange 106 engages ball bearing ring 108. Hydraulic cylinder support ring 112 attaches to lower housing support ring 116 by means of a plurality of assembly bolts 118. Bearings 108, 110 form a connection of hydraulic cylinder support ring 112 and lower housing support ring 116 to laterally extending flange 106 of annular split ring 104. Hydraulic cylinder support ring 112 provides an inwardly extending flange 114 which in combination with the flange 106 of split ring 104 enclose bearing 110.

From the above, it can be seen that housing 12 will rotate and with it rotates certain portions of upper bearing assembly 70 and certain portions of lower bearing assembly 100. Specifically, when body 12 rotates, annular split ring bearing support 74 also rotates. However, annular housing support 78 and upper housing support ring 82 remain still. Similarly, when body 12 rotates, annular split ring 104 rotates with it while hydraulic cylinder support ring 112 and lower housing support ring 116 remain still. Thus, the hydraulic cylinders 50 which are welded to hydraulic cylinder support ring 112 also remain still as do lines 64, 66. Annular ring 30 also remains still during spinning of valve body 12. However, valve body 12 rotates as does crank arm 24 and bearing 28. During rotation, bearing 28 in fact generates a rotational section which is substantially identical to the C-shaped recess 32 of ring 30. When hydraulic cylinders 50 are retracted, ring 30 moves downwardly with push rod 54. When ring 30 moves downwardly with push rod 54, upper flange 35 of annular ring 30 engages bearing 28, transferring load thereto. The phantom lines in FIG. 2 show the lowermost position of annular ring 30 and also the lowermost position of bearing 28. One skilled in the art will see that bearing 28 has been moved downwardly and crank arm 20, 26 has rotated 90°. This effects a closure of bore 22 and of bore 16. In FIG. 1, the uppermost position of annular ring 30 is shown in a cutaway view. Notice that bearing 28 occupies a position within the recess 32 of annular ring 30. Also, crank arm 26 is in the uppermost position as shown in hard lines in FIG. 2. The curved arrow in FIG. 1 illustrates the rotation of stem 24 which will effect a rotation of valve member 20 and a closure of bore 22.

Since lift-eye 40 is connected to ring 30, it will always move therewith. Thus, lift-eye 40 forms a dual function. It firstly can be used to manually move ring 30 between its upper and lower positions if hydraulic power is not available. Secondly, lift-eye 40 functions as an indicator of the position of valve member 20. Thus, the position as shown in FIG. 2 shows the valve to be fully open while the phantom line position shows the valve to be fully closed.

Figure 7:
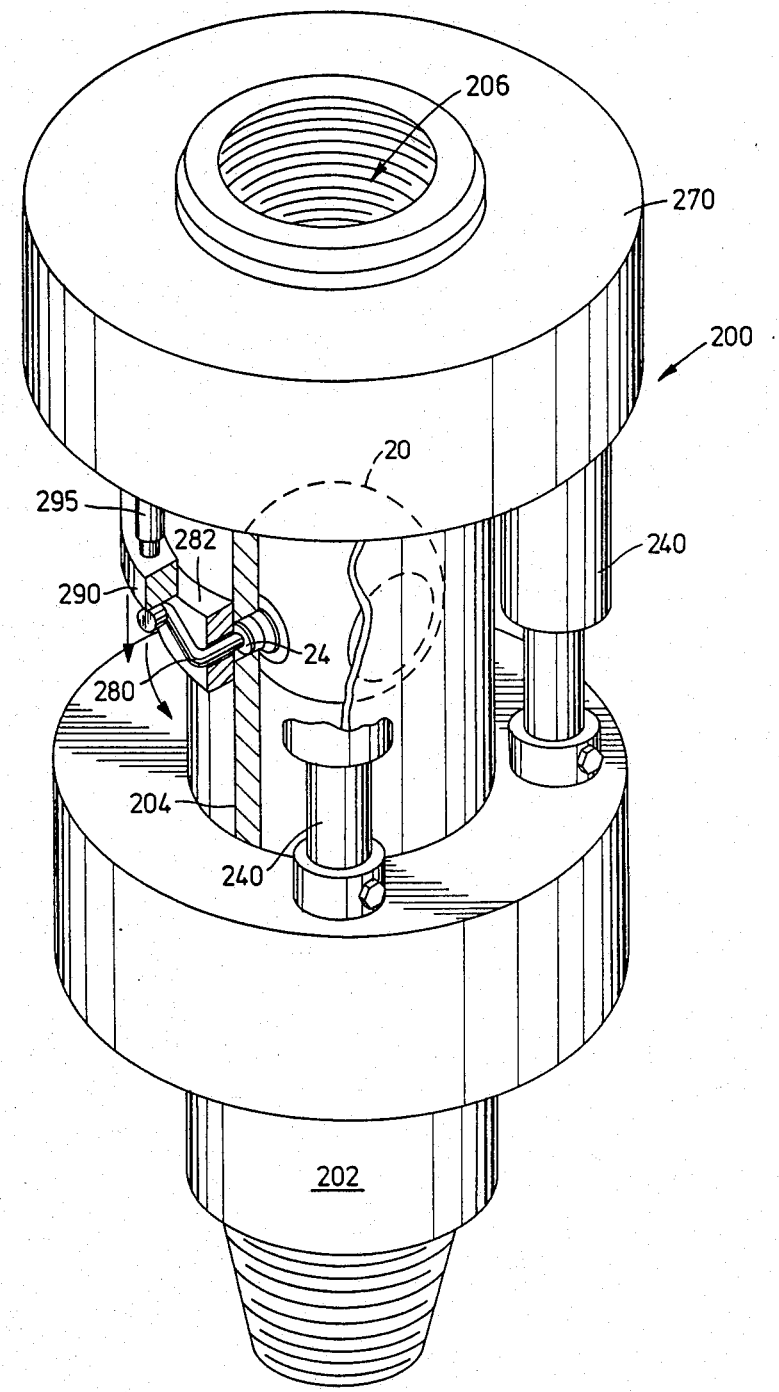
FIG. 7 is a perspective view of the second embodiment of the apparatus of the present invention.
Figure 8:
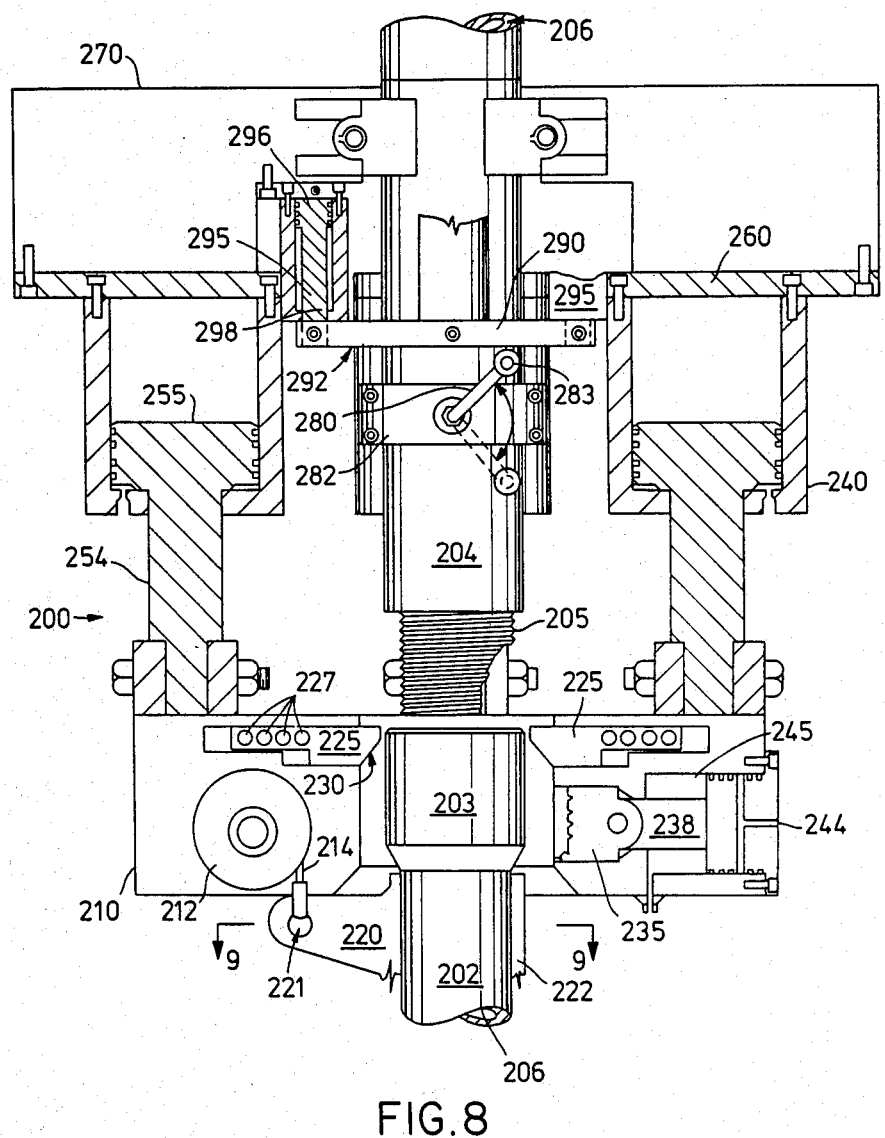
FIG. 8 is a sectional elevational view of the second embodiment of the apparatus of the present invention.
Figure 9:
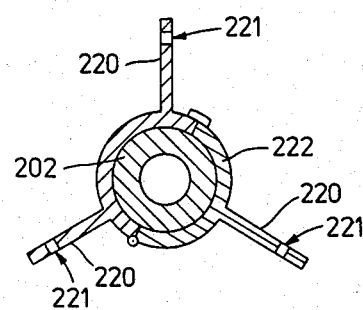
FIG. 9 is a sectional view taken along lines 9—9 of FIG. 8.

FIGS. 7 and 8 illustrate a second embodiment of the apparatus of the present invention which is designated generally by the numeral 200. A first inspection of FIG. 8 shows the uppermost end portion of the drill string and more particularly the last section 202 of drill pipe. Section 202 has a box end 203 which will be made up with tubular valve body section 204 and more particularly the pin 205 end portion thereof, both of which are correspondingly threaded to engage. Tubular valve body section 204 is of substantially the same construction as valve body 12 of the embodiment of FIGS. 1-6, including a valving member, bore and stem. For clarity, description of the valve member and stem are not repeated nor shown in FIGS. 7-8, as they can be seen in FIGS. 1-6 of the drawings. Each section 202, 204 provides a common bore 206 which communicate so that fluid can flow freely therethrough. A housing 210 provides a plurality of radially spaced powered reels 212 each of which has a cable 214 wound thereupon. A plurality of preferably three radial lifting eyes 220 each provide openings 221 for the attachment of cable 214 thereto. Preferably three radial lifting eyes 220 are provided as are a corresponding plurality of three spaced powered reels 212. The reels 212 and lifting eyes 220 radially align so that when load is applied to cables 214 by reels 212, cables 214 are generally vertical and have only vertical load components. Lifting eyes 220 are attached to central lifting sleeve 222 that provides a bore which is slightly larger than the outer diameter of drill pipe section 202 so that sleeve 222 can slide upon section 202 but stops when it engages the enlarged box end 203. Sleeve 222 (see FIG. 9) is a split sleeve so that it can open and close in order to attach or remove from joint 202. A hinge or latch or like connection could secure sleeve 222 about joint 202. Sleeve 222 thus will abut the box 203 end portion of section 202 when reels 212 have fully withdrawn cables 214. This operative position is shown in FIG. 8. Normally the entire actuator 200 is supported by a lift line (not shown) and counterweight so that rig workers can easily lift the entire actuator 200 into position. The bore 206 of section 202 might in an emergency situation be uncontrollably discharging drilling mud onto the drill rig floor, possibly as a prelude to a blowout condition. Rig workers would first extend cables 214 and then attach sleeve 222 to section 202. The driller would then actuate the reels 212 so that cables 214 would be withdrawn. The actuator would then center itself over the box 203 end of joint 202 and make up the joints 202-204 as more particularly specified hereinafter. Hydraulically operated reels 212 can have ratchets to prevent inadvertent withdrawal of cables 214. Such reels 214 and the switches/controls to operate such reels 214 are commercially available devices.

A plurality of radially spaced guides 225 are mounted upon housing 210 and can slide laterally with respect to pipe section 202. Each guide has a plurality of openings 227 which are receptive of pins or other suitable fasteners so that each guide 225 can be adjusted inwardly and outwardly with respect to the bore 206 of joint 202 and then affixed in the desired position for the size pipe involved. The lowermost surface of each guide 225 has a beveled surface 230 which helps align and center housing 210 upon pipe section 202 when each cable 214 is fully wound upon each reel 212. Pressure switches or other suitable means can be used to actuate jaws 235 when cables 214 are fully withdrawn. The jaws 235 are urged inwardly until each jaw 235 abuts and registers with the box 203 end of section 202. Each jaw is shaped to conform to the shape of the box 203 end of pipe section 202. Piston rods 238 and hydraulic pistons 240 move inwardly responsive to the addition of hydraulic fluid under pressure to orifice 244. Cylinder 245 is preferably cylindrical corresponding in section with cylindrical piston 240. Preferably three radially spaced jaws 235 are provided. Pressure switches can also actuate hydraulic cylinders and hydraulic tongs 270 once jaws 235 are fully positioned against box 203 end of pipe section 202.

In order to engage the pin 205 end portion of section 204 with the box 203 end portion of section 202, a plurality of radially spaced (preferably four) hydraulic piston assemblies 250 connect housing 210 with hydraulic tong support plate 260. Each piston assembly 250 provides a hydraulic cylinder 252 and a pushrod 254 which is connected to a hydraulic piston 255 that occupies cylinder 252. Plate 260 supports a conventional power tong assembly 270 such as is manufactured by Eckels, for example. Power tong 270 has a pair of opposed jaws 272, 273 which can grip and rotate pipe joint 204. Thus when hydraulic pistons 250 pull section 204 until the pin 205 end portion thereof abuts the box 203 end of section 202, rotation of jaws 272, 273 will "make up" the joint by engaging the threaded end portion of pin 205 with a similarly, but female threaded portion of box 203 end of section 202.

After the joint of section 202 and 204 is "made up" and properly torqued by applying sufficient pressure through jaws 272, 273, the bore 206 of sections 202, 204 can be closed. A rotation of crank arm 280 effects a corresponding rotation of an interior valving element which is of the same type as the ball valve element 20 of the embodiment of FIGS. 1 and 2. Crank arm 280 assembly of the embodiment of FIGS. 7 and 8, can be of the same construction as arm 26, stem 24, and bearing 28 of FIGS. 1 and 2.

Crank arm assembly 280 can be supported using clamp 282 so that it will stay in the socket of the valving element. Alternatively, the stem and crank arm assembly 280 could be of an integral construction or of an interlocking construction so that the crank arm would not readily fall from the socket of the valve stem.

An annular ring 290 is supported about section 204 by a plurality of hydraulic pistons 295. The pistons force annular ring 290 downwardly to close the valving element of section 204 and thus bore 206. Ring 290 has a smooth undersurface 292 which transfers load from hydraulic cylinders 295 to roller bearing 283 of crank arm assembly 280. In this manner, ring 290 rotates crank arm assembly 280 to the position shown in phantom lines in FIG. 8. Each hydraulic cylinder 295 includes a piston 296, cylinder 297 and piston rod 298. Cylinders 297 can be bolted, for example, to either plate 260 or power tong 270 housing.

Additional bracing such as a plurality of steel rods can be used to structurally interconnect housing 210 and plate 260. Such additional bracing could be used to relieve shear and torsional stresses acting upon cylinders 240.

Figure 10:
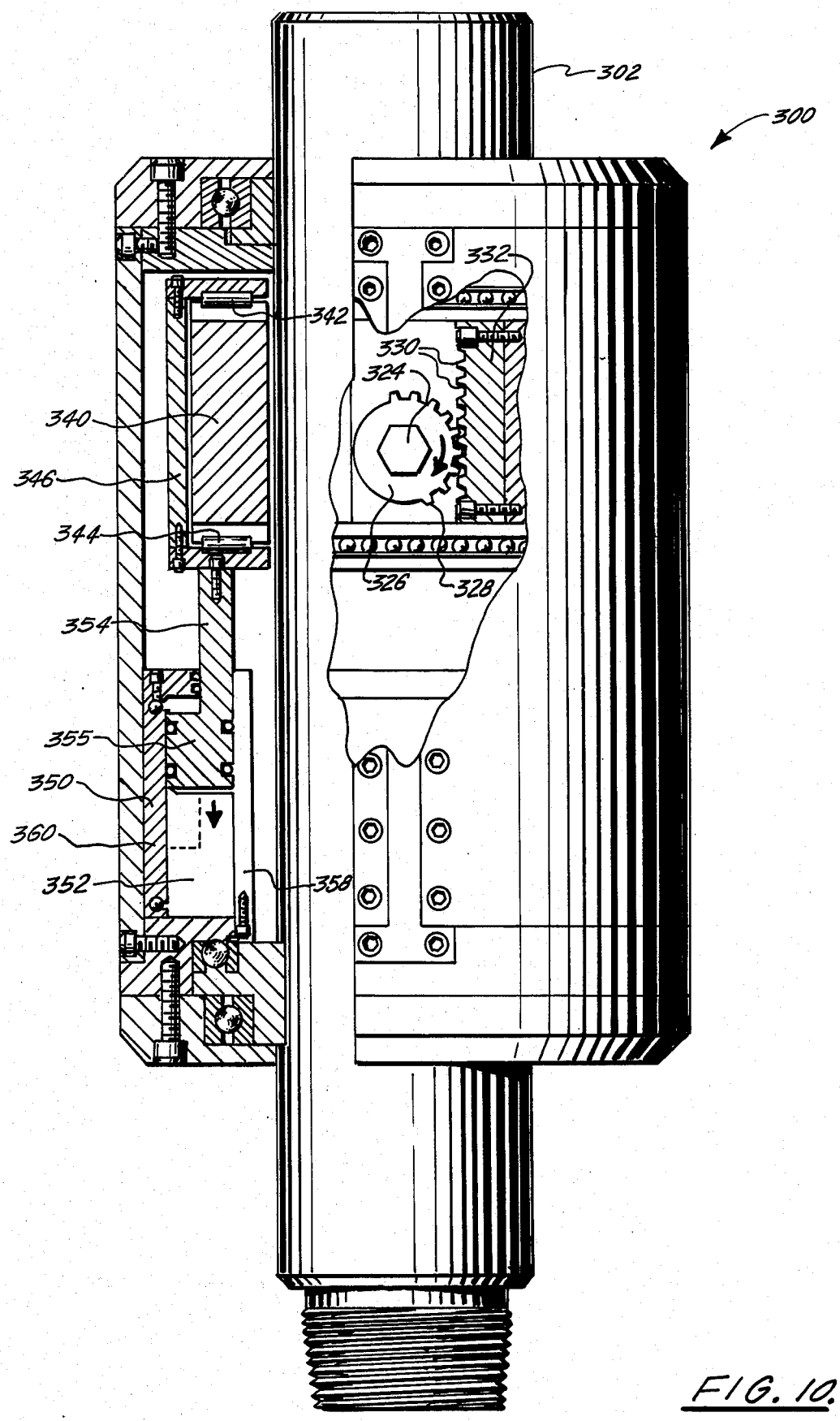
FIG. 10 is a sectional, cutaway view of an alternate embodiment of the apparatus of the present invention.
Figure 11:
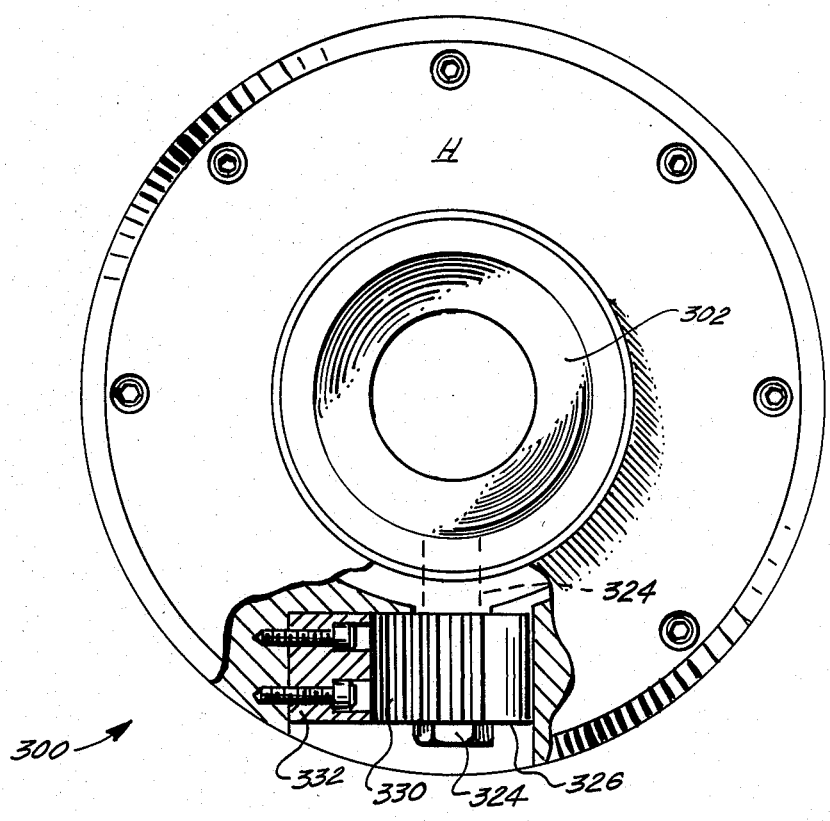
FIG. 11 is a top, cutaway view of the alternate embodiment of the apparatus of the present invention of FIG. 10.

FIGS. 10 and 11 show another alternate embodiment of the apparatus of the present invention which is designated generally by the numeral 300. It should be understood that the construction of many of the components of FIGS. 10 and 11 and of actuator 300 are common with the earlier described embodiments of FIGS. 1-11. Thus, the actuator 300 includes a valve body with a longitudinal bore containing a spherical valve member which is disposed and supported within the body and rotates between open and closed flow positions. The valve body 302 and the valving member (not shown) are the same as with respect to the embodiments of FIGS. 1 and 2. Likewise, the embodiment of FIGS. 10 and 11 include a shaft which is connected to the valve member and can be rotated from the exterior of the valve body 302. In FIG. 11, shaft 324 is shown in phantom lines. In place of the crank arm 26 in the preferred embodiment, shaft 324 connects to a pinion gear 326 having multiple teeth 328 which intermesh with teeth 330 of toothed rack 332.

Rack 332 is connected to an annular carriage 340 that is supported above and below by roller bearing assemblies 342, 344 which form an interface between annular carriage 340 and carriage housing 346 which is also annular. One or more pushrods 354 can support housing 346 and move it up and down in the same manner that hydraulic cylinders 50 elevate and lower annular ring 30 with respect to the embodiments of FIGS. 1 and 2.

Hydraulic cylinders 350 are shown including preferably multiple hydraulic cylinders such as shown with respect to the embodiments of FIGS. 1-7. Each cylinder 350 includes an inner space 352 which contains hydraulic operating fluid and a pushrod 354 having a lower, enlarged portion 355 which conforms to the interior of cylinder 350 as shown in the drawing. It should be understood that hydraulic cylinder 350 could be a single, annular cylinder having an inner wall 358 of one diameter and an outer wall 360 of a larger diameter so that the inner and outer walls 358, 360 are concentric. In such a case, the enlarged portion 355 would likewise be annular in shape, with walls 358, 360 and enlarged portion 355 all extending 360° around housing 302.

The embodiment of FIGS. 10 and 11 would provide a housing of the same construction as with respect to the preferred embodiment of FIGS. 1-7. The details of construction of the housing, the upper and lower bearing assemblies, and the component parts thereof have not been discussed with respect to the embodiment of FIGS. 10 and 11 for the sake of brevity. Those components and their description can be clearly seen and are described herein with respect to FIGS. 1-2 and 5-6 of the drawings.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A drill string safety valve operator, comprising:
   a'. an operator having;
   a. a rotatable tubular body within said operator housing having a longitudinal through bore for conveying fluids;
   b. a valve member movably disposed within the body for valving fluid flow through the bore;
   c. rotatable shaft means extending from and coupled to the valve member for moving the valve to open or close the bore;
   d. a rotary gear carried by the shaft means;
   e. rack means connected to the rotary gear defining a coupling between the valve member and the shaft means for rotation with the shaft means for transmitting an applied load into rotation of the shaft means;
   f. a moving carriage including a rotatable portion that supports the rack means, upper and lower bearing means mounted above and below said rotatable portion, and a carriage housing supporting said bearing means and disposed about said rotatable portion, said bearing means permitting rotation of said rotatable portion relative to said carriage housing; and
   g. power means supporting the carriage housing for powering the carriage to move linearly with respect to the operator housing and between upper and lower positions so that the rack can rotate the rotary gear during an opening or a closing of the valve member.

2. The drill string safety valve operator of claim 1, wherein the powered means is an annular hydraulic cylinder including in part inner and outer concentric wall surfaces.

3. The drill string safety valve operator of claim 2 further comprising a pushrod having an enlarged end portion that extends between the inner and outer wall surfaces.

4. The drill string safety valve operator of claim 1, wherein the rotary gear is a toothed gear.

5. The drill string safety valve operator of claim 1, wherein the rotary gear is a toothed pinion gear.

6. The drill string safety valve operator of claim 4, wherein the rack has teeth which intermesh with the toothed gear.

7. The drill string safety valve operator of claim 1, wherein the powered means is rigid with said operator housing.

8. The drill string safety valve operator of claim 1 wherein the moving carriage includes an annular rotatable portion with a central opening defining an interior surface of the rotatable portion and the rack is affixed to the interior surface.

9. The drill string safety valve operator of claim 1 wherein said bearing means further comprises a plurality of roller bearings interfaced between the rotatable portion and the carriage housing.

* * * * *